United States Patent
Remington

[11] Patent Number: 5,224,425
[45] Date of Patent: Jul. 6, 1993

[54] CABLE SKYDIVING

[76] Inventor: Bruce Remington, 3527 S. Broadway St., Eureka, Calif. 95501

[21] Appl. No.: 717,882

[22] Filed: Jun. 12, 1991

[51] Int. Cl.⁵ .............................................. A63G 31/00
[52] U.S. Cl. ........................................ 104/53; 104/31; 104/113; 105/151
[58] Field of Search ...................... 104/31, 53, 67, 85, 104/93, 112, 113; 105/150, 151; 182/10, 11

[56] References Cited

U.S. PATENT DOCUMENTS

| | | | |
|---|---|---|---|
| 301,923 | 7/1884 | Reisdorff | 105/151 X |
| 535,938 | 3/1895 | Boyton | 104/113 X |
| 1,087,440 | 2/1914 | Freed | 104/113 X |
| 1,859,180 | 5/1932 | Thiel | 104/113 |
| 3,026,816 | 3/1962 | Russo et al. | 104/113 |
| 3,057,305 | 10/1962 | Behrens | 104/53 X |
| 3,070,035 | 12/1962 | Russo et al. | 104/113 |
| 3,484,104 | 7/1967 | Gefortz | 272/29 |
| 3,861,318 | 1/1975 | Massa | 104/113 |
| 4,053,063 | 10/1977 | Harper, Jr. | 104/112 X |
| 4,062,293 | 12/1977 | Davis | 104/113 |
| 4,159,113 | 6/1979 | Callecod | 104/113 X |
| 4,236,454 | 12/1980 | Erickson | 104/69 |
| 4,256,199 | 3/1981 | Sellards | 182/11 |
| 4,348,960 | 9/1982 | Stairseth | 104/114 |
| 4,578,037 | 3/1986 | Bacangis | 434/258 |
| 4,700,632 | 10/1987 | Schmitz | 104/63 |
| 4,737,107 | 4/1988 | Bories | 434/29 |

FOREIGN PATENT DOCUMENTS

| | | | |
|---|---|---|---|
| 340700 | 5/1920 | Fed. Rep. of Germany | 104/67 |
| 2437557 | 2/1976 | Fed. Rep. of Germany | 104/113 |
| 720929 | 2/1932 | France | 104/112 |

Primary Examiner—Robert J. Oberleitner
Assistant Examiner—S. Joseph Morano

[57] ABSTRACT

A diverse variety of high speed gravity cableway rides in which a rider on a pulley block car descends a mountainside and generally stops by frictional forces, due to the design of the cable arc, before hitting the lower cable support point. In some forms, the rider may control his speed with a braking device and use a ski-lift to return to the top of the hill. In all form suitably safe embarking and disembarking platforms or procedures are employed.

18 Claims, 4 Drawing Sheets

CABLE SKYDIVING

BACKGROUND OF THE INVENTION

The thrills and recreational enjoyment derived from gravity powered sports such as skiing, hang-gliding and skydiving are well established. New, properly developed sports of this type are to be welcomed, particularly, if like skiing, they can offer a full spectrum of difficulty levels, ranging from those that cause heart stopping anxiety, for the most hardened daredevil, to extremely gentle versions for the most fearful infant.

The subject invention, a versatile form of cable slide accomplishes the above objectives and more. No relevant prior art, using a slack, arced cable, was discovered by applicant's searches.

OBJECTS AND SUMMARY OF THE INVENTION

This new, exciting, ride invention is ideally suited for use on mountainous terrain, such as at a ski resort, for several reasons. As two elevations are needed for the cable, perhaps thousands of feet apart, it is most economical to build this ride on a natural mountainside no matter how steep, then extend it across a ravine of some kind, and to an adjacent hill or cliff. Otherwise, towers of some sort are necessary, be they high steel towers, big trees, rocks or high rise buildings, in a city.

The cable can be miles long and drop an awesome 10,000 feet, or it could be 20 feet long with a small vertical drop, going from a tree to a ladder in a back yard, or anything in between Ideally, a ski resort or other location will build 20 or 30 different versions of all levels of difficulty, just like ski runs, and with all the degrees of verticality possible in skiing.

Cable skydiving is considerably more versatile than skiing, however in that the gravity powered cable cars used could be designed to go through any degrees of motion or rotation and can hurtle the rider downward to terminal velocity faster than any roller coaster, in any position including standing, sitting, kneeling, prone, frontwards, backwards, or upside down, and in the dark. Cable skydiving is a name for a prone position car and cable surfing would be a standing version.

Cable skydiving and its other forms, also have many other virtues compared to most known sports. Using skiing for comparison, the subject invention is obviously a lot safer, much faster, smoother, incomparably easier, more interesting in its variations, more fun, considerably cheaper, more dependable and certainly warmer most of the time, although it can be practiced in winter also.

The major reason to connect this invention with a ski resort is because of the lifts. That is the only problem with cable skydiving, you go a long way down very, very fast and some power means such as a bus, helicopter, tram or ski-lift is vital in most embodiments, so one can get enough runs in.

The construction of the invention is simple and often consists of two towers or other cable supports at different elevations and a cable loosely strung between them, in the specific manner disclosed in the drawings and discussions below. A pulley block rides on this cable which is attached to some sort of passenger carrying device. To ride the invention, one basically gets onto or into the passenger carrying device from a starting platform, and then releases the brake or other tethering mechanism and travels downward at unbelievable speed, or at a more controlled tempo, if one rides the brake, or the cable's arc is designed for gentler, gradual descent. When the rider reaches the lowest point of the cable, the car continues on up the important last section, which by natural frictional and gravitational means causes the car to stop short of the end support, in most cases. Then, with or without help, the rider gets out of the car onto suitably located exit platforms, and then probably goes back up the hill for another ride. Alternately, the car and rider can be hauled back up the original cable by appropriate powered means, however, in the preferred embodiment the main cable would be too long, and it would be too slow to commercially practice that procedure very often. Rather, the rider exits the car and then removes it from the cable, or an attendant does so, to quickly clear the "track" for the next rider. In this embodiment the attendant may electronically notify the next rider that the cable track is clear, or it may be determined visually. The cars when removed from the main cable are then attached to a separate usually lighter haul-back cable which powers said cars, with or without riders, back to the top. A ski lift can also be used for returning cars, riders or both.

The cable supports need not be towers as the configuration of the ride is ideally determined by the underlying terrain. Low supports, steel anchors in big rocks, trees, ladders, or anything else can be used in various embodiments, and of course they can be both permanent, or portable, if used by a travelling carnival, for example.

The proper design of on-off decks or platforms for passengers to begin and exit the ride is of particular importance in any steep embodiments of this ride. In order to hurtle almost straight down off a cliff, with a thousand foot vertical drop, it is like commencing a hang glide run and the upper platform needs to be exactly designed relative to the terrain and cable above, and to provide a stable sense of security, and real safety.

Depending on the car type, the cable will typically be four or five feet above the starting platform for a sitdown type of ride. The rider must be able to conveniently and safely get onto the car with no fear or actual danger whatsoever, of the car taking off prematurely. He or she must get properly strapped in for safety and then walk over to the edge of the platform. When ready, the rider partially or fully sits down on the cars seat, applying tension to the pulley on the cable, and then pushes off from the platform at whatever speed is desired, very probably "riding the brake" initially. Ideally, you work your way up gradually through the easier versions before embarking on the cliff-jumping or skydiving versions.

Similarly, the exit platforms, and the exit methods used, need to be carefully considered and designed for the terrain, cable pitch, number of people using the ride, weather, help available, and other variables. It can be difficult getting off some versions of this invention unassisted and some form of human assistance or rider controlled appropriately movable ramp system are recommended, if they are not cost prohibitive.

There are three different places one may normally get off the cable. The first is to try to make it all the way up to the lower cable support area 33 of FIG. 2 where there may be nets, ladders, decks or other assistance. In most versions, however, it should not be possible to make it quite to the cable's end support, so disembarking means may need to be arranged for the middle of the upwardly inclined cable near the ride's end, such as 9 of FIG. 1. The easiest place to get off usually is at the cable's nadir 67 which a rider can usually roll back down to, and there get off on some sort of stable deck, such as 10 of FIG. 2, which could be hydraulically raised and lowered by an operator, or by the rider, by pulling on an overhead rope, etc. There are also versions where it would be appropriate to jump off the car into water or snow.

The most critical variable of this invention is the cable arc angle, as determined by the cables ends and low point, see FIG. 3. Looked at from the side view a typical angle might be about 90°, but could vary from about 20° to about 170°.

The arc is determined solely by the cables length, the distance between the support points and the relative distance between their heights. Thus, when adequate terrain has been located for a ride set-up, these variables must be balanced and varied according to the effects desired. The cable should come back upwards at the lower end enough so that maximum attainable speeds will be reduced to near zero before the lower support point is reached. Depending on the cable and pulleys used, enough rise from the nadir to the lower cable support must be engineered in to stop a heavy rider with low air resistance and pulley friction before he crashes into the support. Thus, gravity and pulley frictional forces should be calculated or determined on site, and a strong tail-wind should also be factored in, to make sure that the lower support tower is high enough. Otherwise, net means, springs or other momentum reducers could be used if desired to prevent high speed impacts with the lower cable support means.

In other forms, the design could be such that a brake would have to be used by a particularly fast traveler, or an attendant could activate a brake, net or cable thickening, friction increasing device, etc., as required.

The passenger carrying car, chair, frame, or parachute-like harness, etc. may be designed for either a standing, sitting, kneeling or prone human rider going down in any type of complex rotational, or simple straight-line motion. For example, springs, pivots and any sort of upside down and backwards motions could be arranged, if advantageous. Group cars, like runaway trams, would also be exciting and commercially viable.

Many embodiments of this invention will require a frictional braking mechanism of some kind which will clamp a suitable surface tightly against the cable such as when the rider pulls down on a lever or rope. Any simple, known, suitable mechanical or electrical mechanism may be used. This brake is designed to help reduce the rider's anxiety and to give him control over his speed, however, in some forms of the invention the brake may be necessary in order to reduce the collision with cushioning materials at the ride's lower cable support in the event that it is not high enough for some reason. Generally, however, the ride should be designed such that a dangerous collision at the bottom is impossible. Some forms of the ride will not use a brake.

The preferred embodiment is normally powered by gravity which is naturally highly economical. There are, however, obvious uses for powered telphers which, although more costly, would provide numerous advantages for some rides and situations. For example, a rider could rent a cable for an hour and ride up and down it, or across a canyon and back, without ever getting off the ride, gaining power from batteries, an electrified cable, or other means.

For safety, strong construction and ample seat belts, cages or other harnesses are obviously a must and any known proper systems may be utilized.

The preferred embodiment utilizes a pulley in a block which is usually quickly removable from the main cable in order that another rider can quickly come down from the top unobstructed. Two safety locks on the equipment should be employed in this embodiment, whereby the pulley can not lift off the cable by itself under any circumstances except failure of the first safety lock. If that should occur, then a second safety device 52, in FIG. 4, which opens inwardly, makes it impossible for the block to leave the cable during normal use. An additional pulley block safety feature shown in FIG. 4 is a top housing member, which in the extremely unlikely event of bearing and shaft failure of the pulley, would act as a further safety member, which could slide the assembly and rider gently to the bottom at a slow speed, if ever required to do so.

An ultra-safe version, for the very timid, could incorporate a second light safety cable above the main cable and following it same arc. A second pulley on the upper cable could attach by suitable tension means to the rider's car and move simultaneously with it to guard against main cable failure, however, obviously the latter peril must be rendered impossible by other design and inspection methods, or death could result.

Another important characteristic of this ride that leads to its optimum riding qualities is a heavy cable. The weight is not needed for strength, as it is essentially supporting its own weight only, plus usually only a couple hundred pounds at one time, but for rigidity and maintenance of the originally designed arc.

In a long version, $\frac{1}{2}"-1"$ cable is adequate, and provides sufficient stability and stiffness for best ride characteristics. In an under 50' backyard version the cable size should also be in that range so that it weighs more than the weight of oar plus any rider, if at all possible.

If the cable is too light, then during the ride it forms a series of straight lines, reducing speed considerably and rendering the ride deleteriously jerky.

In order to design the ride properly it is necessary to control the actual and relative heights of the cables support points, and to regulate the length of the cable with respect to said points, and to the ground. To keep the artificial end towers cost to a minimum, the cable arc should be governed primarily by the underlying terrain. In that regard, it is usually necessary to remove obstructions from the path of the ride. This may involve cutting down trees, and digging away the ground at various points where the cable comes within a few feet of the ground, as an alternative to using a very high lower cable support tower.

A further important adjunct of this invention is a powered system for returning the pulley block cars to the ride's starting point at the conclusion of the ride, as alluded to above.

This may be done in any expedient manner including: a pull-back rope, other dangling tension member or an elastic band hooked between the starting point and the car, when only one car per cable is employed. Or, an adjoining ski lift may be used whereby the car is removed from the cable and attached to an upgoing lift by appropriate means, and then unloaded and reinstalled on the cable at the starting platform. Ideally, however, another light, simple endless, powered cable about six feet from the ride's termination platform would extend up to the starting platform. Then a rider, or attendant, could quickly remove a pulley block car from the main cable and attach it to the endless return cable, which, in the manner of a ski lift, would return the cars to the top of the ride, where they could be easily removed and reinstalled onto the main cable at the starting platform. Or, telphers could be used and in gradual pitch versions of this invention could serve as an interesting sightseeing vehicle for miles of panoramic views over canyons, for example.

An important advantage of this invention is that endless modifications of the natural terrain are possible, and suggested, in order to enhance the ride's beauty, excitement and general stimulation. For example, many types of tunnels through trees, buildings, under or through waterfalls could be designed, or wild animals could be roaming near the cable's low points or fires, chasms or dark places, and other horrors, could be cleverly utilized.

Another interesting variation on the invention would be to put several cable rides in series, such that one could easily get from one to another and eventually to the bottom of a mountain where a succession of chair lifts would return the eager rider to the top again, with or without his original car.

One skilled in the appropriate amusement park business and art could quickly conceive of countless variations on all these cited forms of the invention which are offered as exemplification only, and are certainly not to be construed as limiting the scope of this invention in any fashion.

Other objectives, advantages and characteristics of the invention will become apparent in the following descriptions.

BRIEF DESCRIPTION OF THE DRAWINGS

The invention will be described with reference to the following drawings wherein.

DETAILED DESCRIPTION OF THE PREFERRED EMBODIMENT

Figure 1:
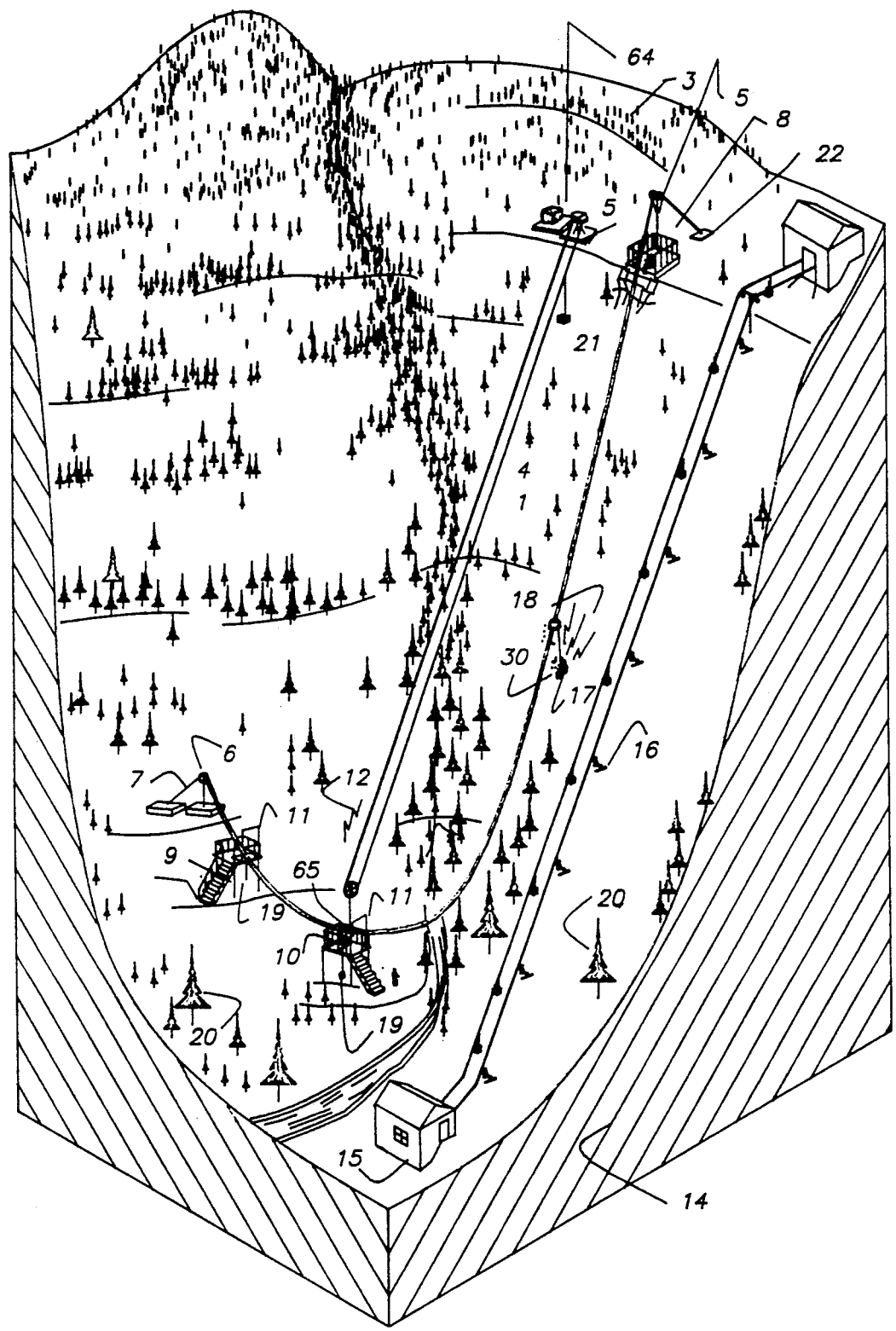
FIG. 1 represents a schematic, panoramic, perspective view of a mountainous portion of a ski resort at which the invention is installed.

FIG. 1 shows a steep mountainous scene of profile 14 from a typical ski resort which has conveniently located ski lift 2 adjacent to the subject invention's main cable 1. Trees 3 and 20 are also shown as part of this panoramic vista which includes draw 13. The other salient features of the invention are a top cable support 5 and bottom cable support 6, both shown in tower form, with the adjustable extension of cable 1 continuing on into ground supporting devices 7 at both ends of cable 1. Ride starting platform 8 and upper and lower disembarking platforms 9 and 10 are also clearly illustrated.

To ride the device, a fun-loving human 64 climbs steps 22 to the starting platform, mounts a car 30, and then rolls down cable 1 with a pulley connected between the cable and car as represented at 17, with directional speed 18.

When the ride ends, the rider gets off of the car 30 at a suitable platform 9 or 10 and exits the ride, placing his car 30 on winch powered car return device 4, which by a suitable attachment means grasps each car and returns them to the starting platform. One such car being returned is represented by 21. The simple details of the ride will become even clearer as the other figures are explained in turn.

Figure 3:
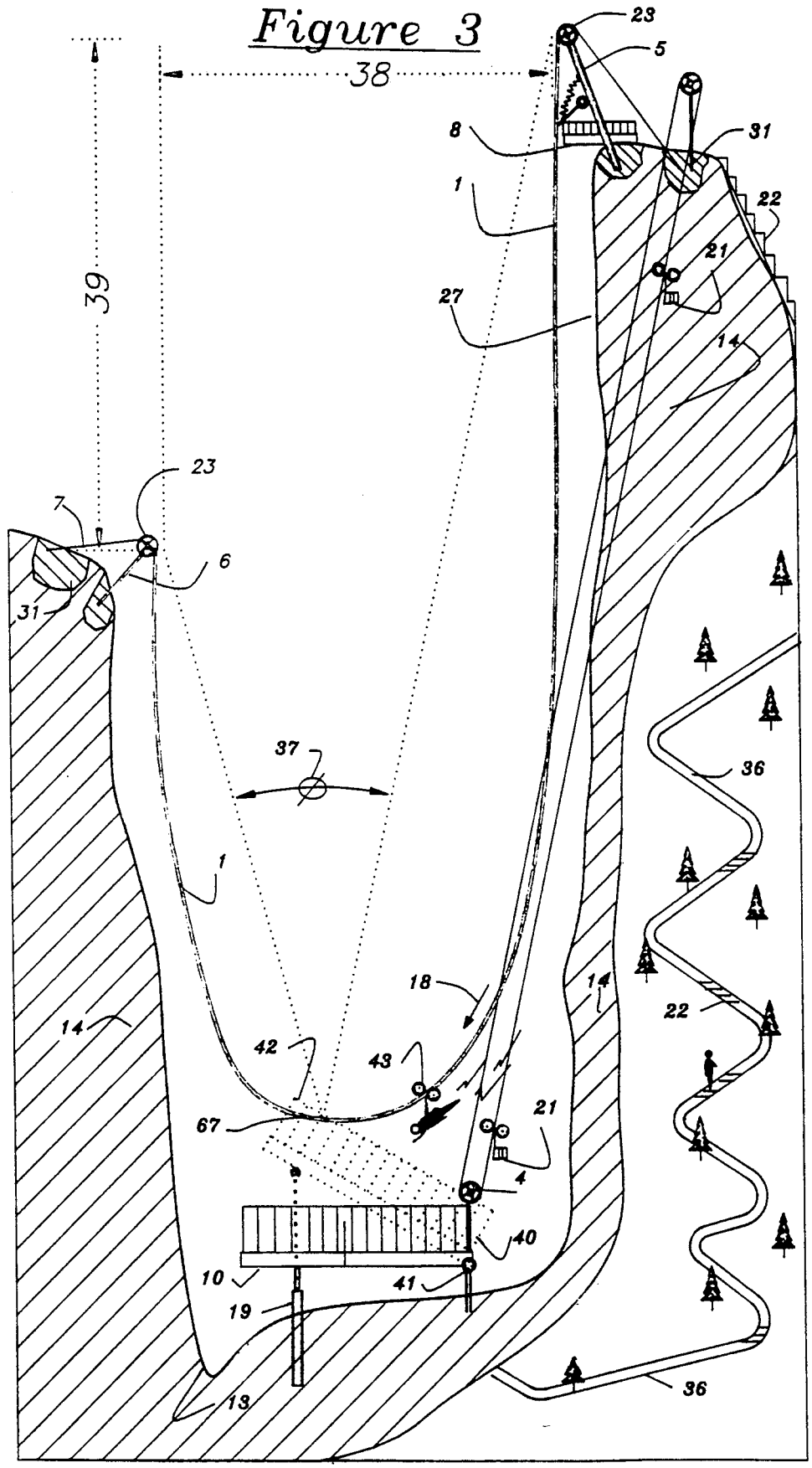
FIG. 3 is a diagrammatic representation of a typical cable arc of the invention.

Also shown in FIG. 1 are controls 11 for raising a portion 65 of the disembarking platforms to a proper height which may be actuated by a rider or an attendant. Proper height means to approximately two feet below the car so that the rider may safely stand-up, protected by appropriate guard rails, and then take off his seat belts and other safety apparatus, easily remove the car from the cable, and then exit the area. This must be done so that another rider can quickly come hurtling downward with no obstructions on the cable in his way. Before the next rider can come down however, this raisable deck portion 65, or 42 as shown in FIG. 3 must be lowered out of the way of the descending path which means 6'-10' below the cable 1, so that the next car and rider will easily pass safely 3'-10' above, or beside, said movable disembarking deck portions of said platforms. Cylinder 19 provides the power to decks 65 and 42.

Obviously it is critically important that the cable be clear, just as a roller coaster track must be, and other ways to insure that fact are direct visual determinations, that the last rider has satisfactorily exited the lower areas, or some form of electronic communication whether by lights, voice or other means. This principle is represented by electronic waves 12.

In order to ride again, the adventurer takes typical chair 16 back up lift 2 which is powered by conventional powerhouse 15.

Figure 2:
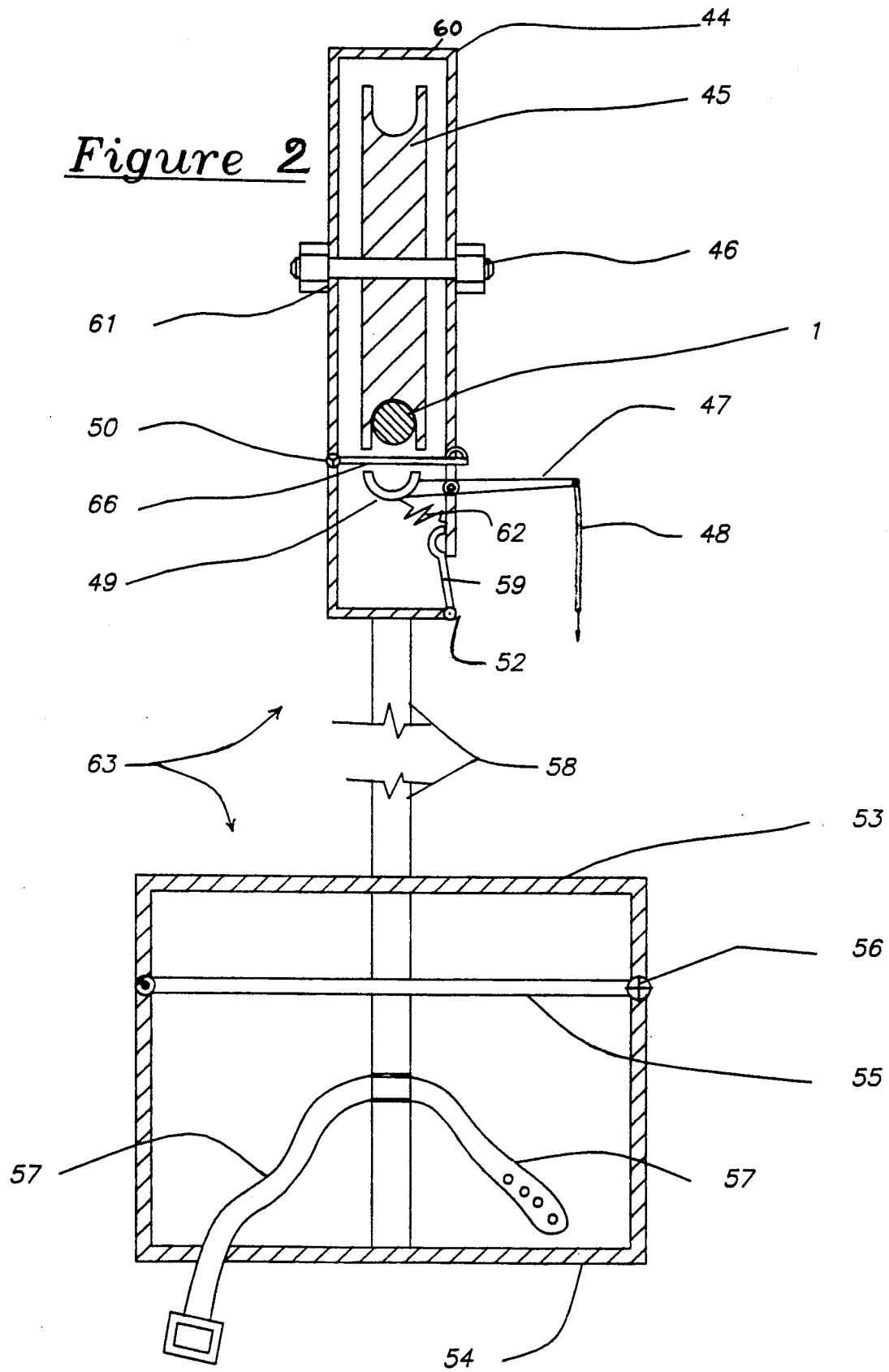
FIG. 2 is an elevation of an advanced version of the invention.

In FIG. 2, the above components are shown a little more clearly, and it includes these additional details:

Stops 23, on the tops of cable support towers 5 and 6, insure that the cable cannot fall to the ground, even if it were to somehow come loose from supports 31. Also shown is a cable 24 from an upper cable ride which deposits riders near to the steps 22 for the ride shown. This upper ride may be one of a series, and has lower cable support 25 and disembarking platform 26.

The principle ride shown in FIG. 2 starts at the top of steep cliff 27 and is a thrilling, nearly vertical ride. A prospective rider 29 climbs steps 22 to platform 8 from which he gets into or onto a car, shown as sitting type car 30, being held in position by device 28 while the rider gets situated and safely strapped in.

This ride goes very quickly and goes to the highest possible point 33 before gravity and frictional forces return the car to the lowest part of the cable, perhaps after going back and forth a few times if no brake is used. Probably an attendant will then operate cylinder 19 with controls 11 for power unit 35 to move himself, and raisable deck 65, into a position where he can help the rider unstrap, disembark and also remove the car from the cable, unless a pull-back rope is used in shorter versions of the invention. Anything that works that is appropriate to the economics of the situation should be used. At the conclusion of the descent the rider will generally go back up chair lift 2 to the top for another run, and as represented at 32 is taking his own personal riding car up with him.

FIG. 3 shows a similar ride with a few other important variables and variations. Walking path 36 is the only way to get back to the top of cable 1 in this embodiment. Also represented is steepness angle $\phi$ which is determined as shown from the cable's highest, lowest and end support points and could vary from about 20° to 170° in this invention. The distance between the cable supports is called 38 and the difference in elevation between the cable supports is 39. 38 is proportional to 39 and consequently for small distances 38, 39 must also be small which results in the top of the lower support being nearly as high as the top of the upper one. Conversely, for large distances 38, the bottom support can be at a much lower elevation than the top support, and frictional forces will still prevent a rider from crashing into the bottom support.

Another type of disembarking ramp with railings 40 is shown, which also moves up or down as required to assist the rider in exiting the invention. Said ramp pivots at 41 which is flush with ground level. The highest point which ramp 40 can assume with the cylinder fully extended is shown by dotted lines 42.

At 43, a prone cable skydiver is shown in the middle of a ride.

Figure 4:
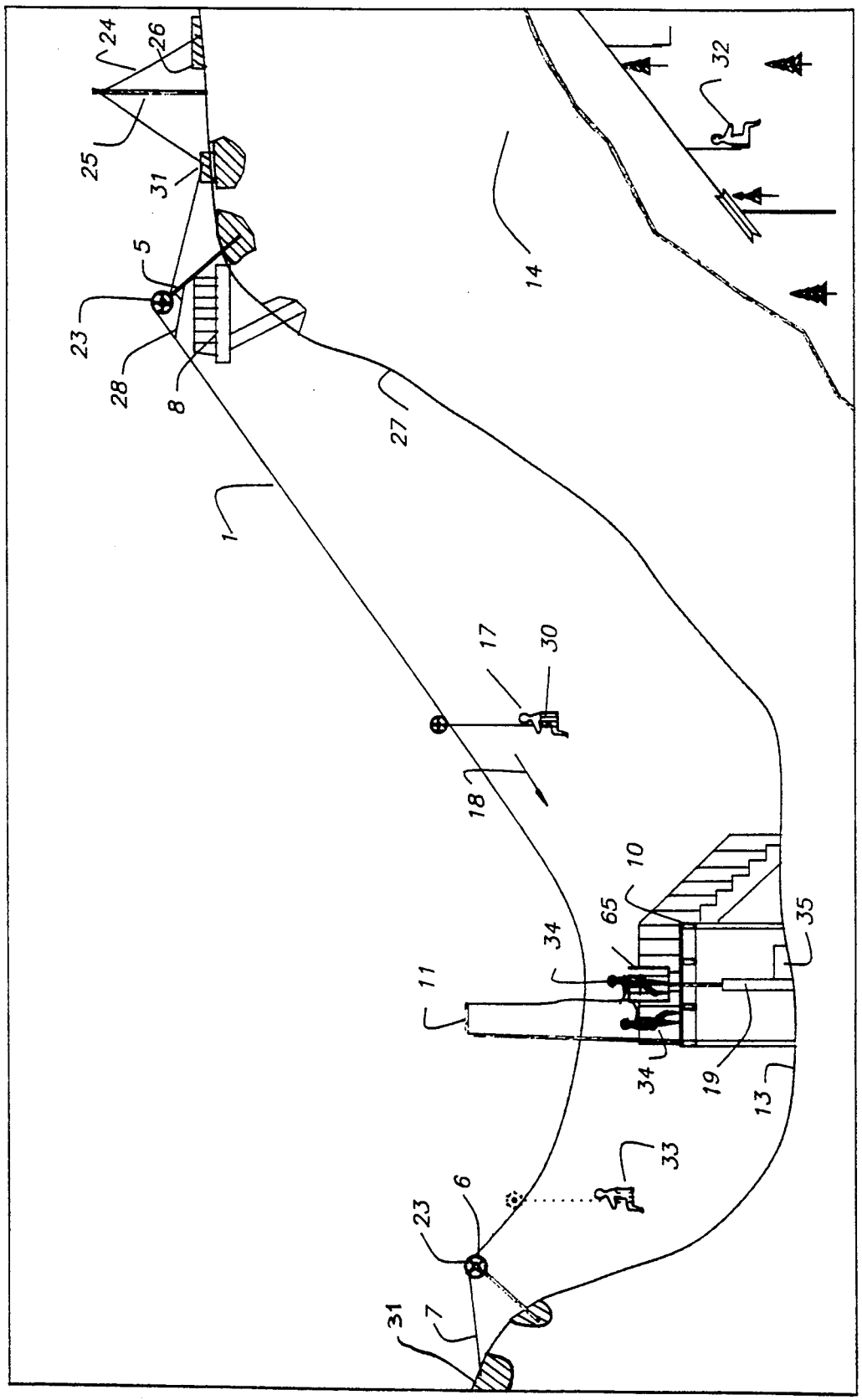
FIG. 4 is a vertical plan view of a typical pulley block and simple car.

FIG. 4 shows overall car assembly 63, consisting of a pulley block, brake and chair. Pulley block housing 44 supports steel pulley 45 on shaft bolt 46 whose nut is welded on to prevent removal. Frictional brake shoe member 49 is activated by handle 47 which can be operated by a rider at any time by pulling down on rope or chain 48. Brake spring 62 holds the brake shoe away from the cable when braking is not required.

A safety bar 66 is hinged at 50 and has the purpose of preventing the cable 1 from leaving the pulley's grove under any circumstances. Spring hook 51 secures the end of bar 66, however said hook can be quickly opened whereby lever 66 pivots down releasing cable 1, so that the car can be removed from the cable through opening 59 in housing 44. Second safety hook 52 crosses opening 59 making it impossible for a car to leave the cable in normal use, however, it can be quickly opened to easily remove the car form the cable when necessary.

Strong bar 58 connects the pulley block assembly to seat 54 of a human sitting compartment which includes back brace 53 and hinged lap bar 55 which holds riders firmly in place and is hooked at 56 by a strong, reliable hooking method of any known type. Seat belts 57 are a must for an additional safety margin, and possibly they should be locked in such a way that a rider cannot unfasten them, only the attendant at the ride's bottom.

Other features shown in FIG. 4 are housing top 60 which makes it impossible for a car to leave the cable during normal use even in the unlikely events of bearing failure or axle disintegration. 61 depicts a greased sleeve or bearing assembly as specified for a specific embodiment.

The foregoing discussion of various specific features is designed solely to clarify the fundamental workings of the invention and should not be considered to be limiting in any way. Accordingly, the true scope of the invention is to be limited solely by the following claims:

That which is claimed is:

1. A cable amusement ride comprising:
   an upper and lower cable support, said lower cable support being located at a considerably lower elevation than said upper cable support;
   a cable loosely hung between said upper and lower cable supports such that the nadir of said cable is at a lower elevation than said upper and lower cable supports;
   slidable means mounted on said cable for movement therealong;
   passenger support means connected to said slidable means for supporting at least one passenger for travel along said cable;
   access means located below said upper cable support for permitting entry of said at least one passenger for commencement of said ride;
   return means for returning said slidable means to said access means upon completion of said ride, and
   disembarking means located below said lower cable support, said disembarking means having actuation means for moving said disembarking means between a first position whereat said at least one passenger passes freely past said disembarking means during traversal of said cable, and a second position wherein said at least one passenger contacts said disembarking means so as to disembark from said passenger support means upon completion of said ride.

2. A cable amusement ride comprising:
   an upper and lower cable support, said lower cable support being located at a lower elevation than said upper cable support;
   a cable of varying length loosely hung between said upper and lower cable supports such that the nadir of said cable is at a lower elevation than said upper and lower cable supports;
   slidable means mounted on said cable for movement therealong in one direction beyond said nadir to an intermediate position between said lower cable support and said nadir, and in an opposite direction for intersection with disembarking means;
   passenger support means connected to said slidable means for supporting at least one passenger for travel along said cable;
   access means located below said upper cable support for permitting entry of said at least one passenger for commencement of said ride, and
   return means for returning said slidable means to said access means upon completion of said ride.

3. A cable amusement ride comprising:
   an upper and lower cable support, said lower cable support being located at a lower elevation than said upper cable support;
   a cable loosely hung between said upper and lower cable supports such that the nadir of said cable is at a substantially lower elevation than said upper and lower cable supports;
   slidable means mounted on said cable for movement therealong in one direction beyond said nadir to an intermediate position between said lower cable support and said nadir, and in an opposite direction for intersection with disembarking means;
   passenger support means connected to said slidable means for supporting at least one passenger for travel along said cable;
   access means located below said upper cable support for permitting entry of said at least one passenger for commencement of said ride;
   return means for returning said slidable means to said access means upon completion of said ride, and
   wherein said at least one passenger may pass freely by said disembarking means during transversal of said cable.

4. The cable amusement ride of claim 3 further comprising brake means for selectively controlling the rate of descent of said slidable means during transversal of said cable.

5. The cable amusement ride of claim 3 wherein angle φ formed by a line connecting the tops of the two said cable supports to the said nadir of said cable is less than 170°.

6. The cable amusement ride of claim 3, wherein the passenger support means provides sufficient carrying space for the passenger to assume a prone position.

7. The cable amusement ride of claim 3, wherein at said access means, said passenger support means firmly held and prevented from descending while a passenger is embarking, by safety holding means.

8. The cable amusement ride of claim 3 wherein the passenger support means includes a securing harness means.

9. The cable amusement ride of claim 3 wherein said return means for said slidable means is in an existing ski lift.

10. The cable amusement ride of claim 3, wherein said return means comprises a second cable powered by a power means.

11. The cable amusement ride of claim 3 wherein the disembarking means is an impact crushing material.

12. The cable amusement ride of claim 3, further comprising impact reduction means for reducing the impact between said slidable means and said lower cable support.

13. The cable amusement ride of claim 3 wherein said cable is at least $\frac{1}{4}''$ in diameter.

14. The cable amusement ride of claim 3, wherein one of said access means and said disembarking means includes a ladder.

15. The cable amusement ride of claim 3, wherein said slidable means comprises a pulley system for rollingly contacting said cable, with safety means for preventing accidental disengagement of said cable from said pulley system.

16. The cable amusement ride of claim 3 wherein said disembarking means is moved into proper position by a power means.

17. The cable amusement ride of claim 3 wherein at least one cable support is portable.

18. The cable amusement ride of claim 3 wherein at least one cable support is a natural object.

* * * * *